United States Patent
Langston et al.

(10) Patent No.: US 12,172,717 B1
(45) Date of Patent: Dec. 24, 2024

(54) APPARATUS FOR RELEASING MAGNETIC CRAWLER FROM FERROMAGNETIC OPERATING SURFACE

(71) Applicant: United States of America as represented by the Secretary of the Navy, Arlington, VA (US)

(72) Inventors: Tye Langston, Lynn Haven, FL (US); Dane Maglich, Panama City, FL (US); David Swedberg, Panama City, FL (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 404 days.

(21) Appl. No.: 17/859,925

(22) Filed: Jul. 7, 2022

(51) Int. Cl.
*B62D 55/265* (2006.01)
*H01F 7/02* (2006.01)

(52) U.S. Cl.
CPC ......... *B62D 55/265* (2013.01); *H01F 7/0257* (2013.01)

(58) Field of Classification Search
CPC .................................................. B62D 55/265
See application file for complete search history.

(56) References Cited

U.S. PATENT DOCUMENTS

| | | | | |
|---|---|---|---|---|
| 3,638,600 A | * | 2/1972 | Modrey | B63B 59/08 451/227 |
| 3,960,229 A | * | 6/1976 | Shio | B63B 59/10 180/9.1 |

\* cited by examiner

*Primary Examiner* — William R Harp
(74) *Attorney, Agent, or Firm* — James T. Shepherd

(57) ABSTRACT

An apparatus for releasing a magnetic crawler from a ferromagnetic operating surface has a ramp fabricated from lightweight non-magnetic materials. The ramp includes a base portion, inclined upper portion for receiving a magnetic crawler, a front end and a rear end. Ferromagnetic members are positioned on the top surface of the upper portion and configured to be magnetically attached to the tracks or wheels of a magnetic crawler. Magnets are positioned on the bottom portion and configured to be magnetically attached to a ferromagnetic operating surface upon which the magnetic crawler operates. In some embodiments, the lightweight non-magnetic materials are highly buoyant.

20 Claims, 5 Drawing Sheets

APPARATUS FOR RELEASING MAGNETIC CRAWLER FROM FERROMAGNETIC OPERATING SURFACE

FIELD OF THE INVENTION

The present invention relates to an apparatus for releasing a magnetic crawler from a ferromagnetic operating surface.

BACKGROUND

Magnetic crawlers or vehicles serve many purposes in industry and defense. For example, magnetic crawlers are used to inspect pipelines, oil refineries, storage tanks, nuclear reactors, ship hulls and other areas that may be inaccessible to or dangerous for humans. Magnetic crawlers operate or maneuver upon ferromagnetic operating surfaces, also known as driving surfaces. Upon completion of their tasks, these magnetic crawlers must be removed from their operating surfaces. However, the magnetic forces that maintain the magnetic crawler on the operating surface are very strong. A single person (i.e. operator) must overcome the magnetic force by manually pulling the magnetic crawler off of the operating surface. Large-sized magnetic crawlers are used to transport large payloads. The magnetic bond between a large-sized magnetic crawler and the operating surface is substantially stronger in comparison to the magnetic bond between a smaller-sized magnetic crawler and the operating surface. Accordingly, more force is required to remove a large-sized magnetic crawler and the operating surface. Often, the force required is much greater than what a single person can produce. Furthermore, pulling a large magnetic crawler off the magnetic operating surface could produce high stresses throughout the magnetic crawler's chassis and drive train which may result in mechanical failures. The magnetic crawler is attracted to any ferrous metal. After the magnetic crawler is removed from the operating surface, the magnetic crawler may inadvertently become magnetically attached to some other ferromagnetic object or structure. There are several conventional techniques used to remove a magnetic crawler from the operating surface. One such technique is manual force exerted by one or more operators, which was discussed in the foregoing description. Another conventional technique is to navigate the magnetic crawler to a non-magnetic surface. However, such a non-magnetic surface may not be available. Another conventional technique is to equip the magnetic crawler with electromagnets that can reverse the polarity so as to release the magnetic crawler from the ferromagnetic operating surface. However, electromagnets add significant weight and complexity to the magnetic crawler. Another conventional technique is to cover the magnetic crawler's magnets with a non-magnetic packing material to prevent magnetic bonding with unwanted ferromagnetic surfaces or objects. However, covering the magnetic crawler's magnets with packing material is a time consuming process that diverts manpower which could be used for other purposes. Furthermore, extreme environmental settings and inclement weather make the use of the packing material impractical.

What is needed is a new apparatus to release magnetic crawlers from the ferromagnetic operating surfaces in a timely and cost effective manner.

SUMMARY

Accordingly, it is an object of the present invention to provide a novel apparatus for releasing a magnetic crawler from a ferromagnetic operating surface that eliminates the problems and disadvantages associated with conventional devices, techniques or methods discussed in the foregoing description.

Another object of the present invention is to provide an apparatus for releasing a magnetic crawler from a ferromagnetic operating surface that is easy to use and transport.

A further object of the present invention is to provide an apparatus for releasing a magnetic crawler from a ferromagnetic operating surface that is inexpensive to manufacture.

Other objects and advantages of the apparatus for releasing a magnetic crawler from a ferromagnetic operating surface disclosed herein will become more obvious hereinafter in the specification and drawings.

Embodiments of an apparatus for releasing a magnetic crawler from a ferromagnetic operating surface are disclosed herein. The apparatus comprises a ramp that is fabricated from non-magnetic materials and configured to gradually reduce the magnetic bond between the magnetic crawler and the ferromagnetic operating surface upon which the magnetic crawler operates so as to release the magnetic crawler from the ferromagnetic operating surface. The ramp imparts minimal stress on the magnetic crawler. In some embodiments, the non-magnetic materials are highly buoyant. The ramp comprises an upper portion having an inclined, top surface. Ferromagnetic members are attached to the top surface and are configured to be magnetically attached to the tracks or wheels of the magnetic crawler. The ramp also includes a bottom portion that contacts the ferromagnetic operating surface upon which the magnetic crawler operates. Magnets are located on the bottom portion and are configured to be magnetically attached to the ferromagnetic operating surface. The magnetic crawler is driven onto the ramp until the magnetic bond between the magnetic crawler and ferromagnetic operating surface is significantly weakened. Once the magnetic bond between the magnetic crawler and the ferromagnetic operating surface is significantly weakened, the personnel or operators may easily remove the magnetic crawler, with the ramp attached thereto, from the ferromagnetic operating surface. The magnetic crawler is now released from the ferromagnetic operating surface and magnetically attached to the plurality of ferromagnetic members on the top surface of the ramp. The magnetic crawler may now be loaded onto a transport vehicle. The ramp remains magnetically attached to the magnetic crawler as the magnetic crawler is being lifted thereby allowing both pieces of equipment to be recovered simultaneously. The personnel or operators may do this manually or, in the case of a large magnetic crawler, utilize a crane or similar lifting device to lift the magnetic crawler. Since the ramp remains magnetically attached to the magnetic crawler, the ramp covers the tracks of the magnetic crawler so as to prevent the tracks from magnetically attracting other ferromagnetic materials or objects.

In accordance with some embodiments, an apparatus for releasing a magnetic crawler from a ferromagnetic operating surface comprises a ramp fabricated from non-magnetic material. The ramp has a base portion, an inclined upper portion for receiving a magnetic crawler, a front end and an opposite rear end. The apparatus further comprises ferromagnetic members that are positioned on the upper portion and configured to be magnetically attached to tracks or wheels of a magnetic crawler, and a plurality of magnets positioned on the bottom portion and configured to be magnetically attached to a ferromagnetic operating surface upon which the magnetic crawler operates.

In accordance with some embodiments, an apparatus for releasing a magnetic crawler from a ferromagnetic surface comprises a ramp fabricated from non-magnetic materials. The ramp comprises a base portion having a bottom surface, an upper portion having an inclined, top surface for receiving a magnetic crawler, a front end and an opposite rear end. The apparatus further comprises a first plurality of ferromagnetic members on the top surface of the upper portion and linearly arranged between the front end and the rear end. The first plurality of ferromagnetic members is configured to be magnetically attached to a portion of a magnetic crawler. The apparatus further comprises a second plurality of ferromagnetic members on the top surface of the upper portion and spaced apart from the first plurality of ferromagnetic members. The second plurality of ferromagnetic members are linearly arranged between the front end and the rear end and configured to be magnetically attached to another portion of the magnetic crawler. The apparatus further comprises a plurality of magnets positioned on the bottom surface of the base portion and configured to be magnetically attached to a ferromagnetic operating surface.

In some embodiments, an apparatus for releasing a magnetic crawler from a ferromagnetic operating surface comprises a ramp fabricated from highly buoyant, non-magnetic material. The ramp comprises a base portion having a bottom surface, an upper portion having an inclined, top surface for receiving a magnetic crawler, a front end and a rear end. The ramp further comprises a left side portion that is contiguous with the base portion and upper portion, and a right side portion that is contiguous with the base portion and upper portion. The ramp has a height that linearly tapers from the rear end to the front end. The apparatus further comprises a first plurality of ferromagnetic members on the top surface of the upper portion and linearly arranged in a first column that extends between the front end and the rear end. The first plurality of ferromagnetic members is configured to be magnetically attached to a portion of a magnetic crawler. The apparatus further comprises a second plurality of ferromagnetic members on the top surface of the upper portion and linearly arranged in a second column that extends between the front end and the rear end. The second column is spaced apart from the first column. The second plurality of ferromagnetic members is configured to be magnetically attached to another portion of the magnetic crawler. The apparatus further comprises a plurality of magnets on the bottom surface of the base portion and configured to be magnetically attached to a ferromagnetic operating surface upon which the magnetic crawler operates.

In some embodiments, an apparatus for releasing a magnetic crawler from a ferromagnetic operating surface comprises a ramp that comprises a stack of laminations of highly buoyant, non-magnetic material. The ramp has a base portion and an upper portion. The upper portion has an inclined, top surface for receiving a magnetic crawler. The ramp includes a front end and a rear end. The apparatus further comprises a first plurality of ferromagnetic members positioned on the top surface of the upper portion and linearly arranged in a first column extending between the front end and the rear end. The first plurality of ferromagnetic members is configured to be magnetically attached to a portion of a magnetic crawler. The apparatus further comprises a second plurality of ferromagnetic members positioned on the top surface of the upper portion and linearly arranged in a second column that extends between the front end and the rear end and is spaced apart from the first column. The second plurality of ferromagnetic members is configured to be magnetically attached to another portion of the magnetic crawler. The apparatus further comprises a plurality of magnets positioned on the base portion and configured to be magnetically attached to a ferromagnetic operating surface upon which the magnetic crawler operates.

Certain features and advantages of the present invention have been generally described in this summary section. However, additional features, advantages and embodiments are presented herein or will be apparent to one of ordinary skill of the art in view of the drawings, specification and claims hereof. Accordingly, it should be understood that the scope of the invention shall not be limited by the particular embodiments disclosed in this summary section.

DETAILED DESCRIPTION

Figure 1:
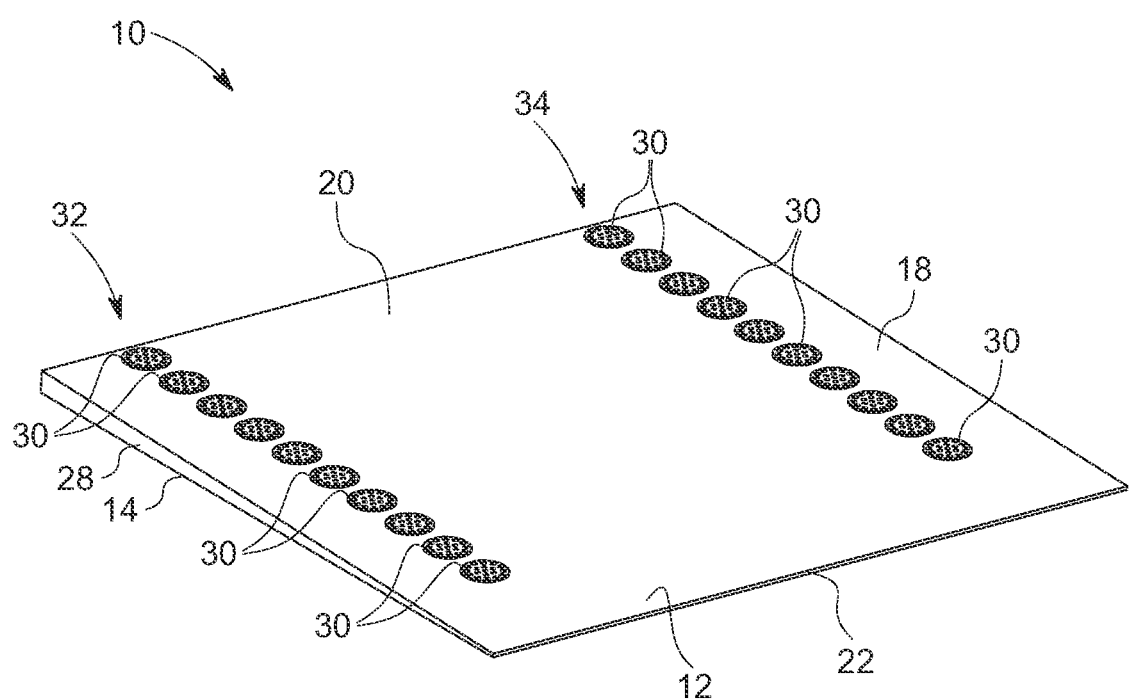
FIG. 1 is a perspective view of an exemplary embodiment of an apparatus for releasing a magnetic crawler from a ferromagnetic operating surface, the view showing the front end, right side and top portion of the apparatus.
Figure 2A:
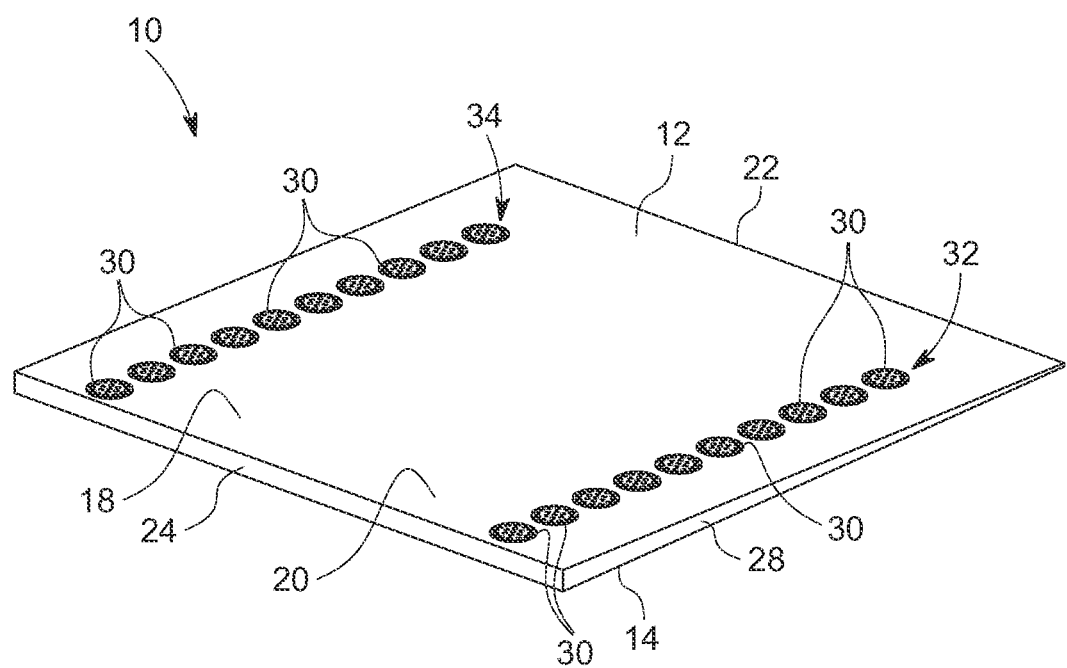
FIG. 2A is another perspective view of the apparatus of FIG. 1, the view showing the rear end, right side and top portion of the apparatus.
Figure 2B:
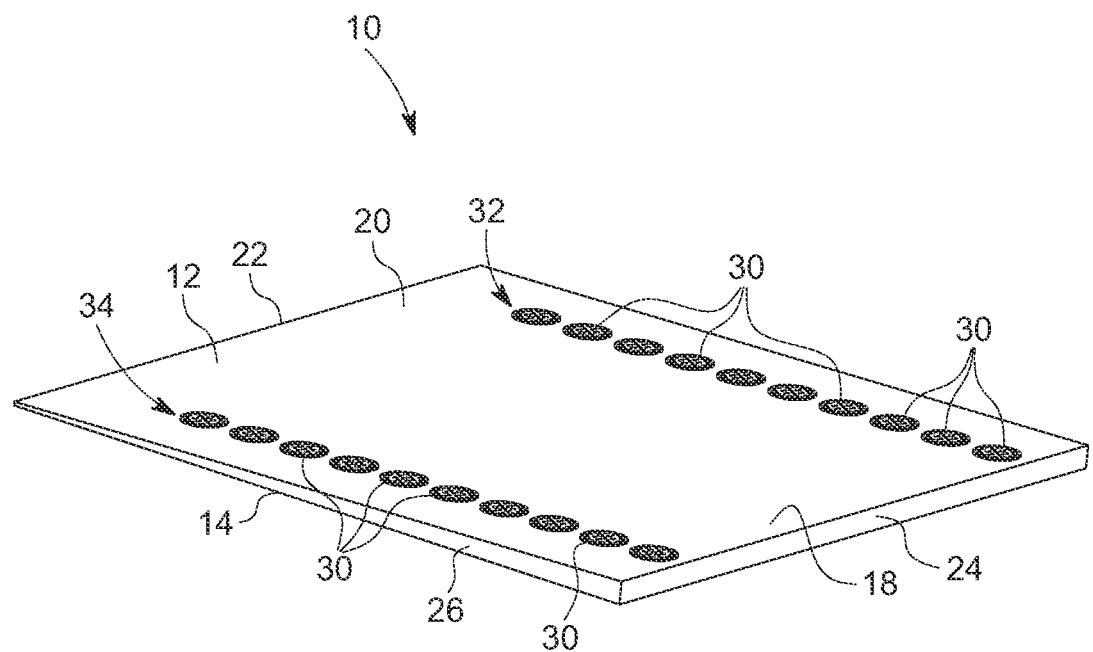
FIG. 2B is another perspective view of the apparatus of FIG. 1, the view showing the rear end, left side and top portion of the apparatus.
Figure 3:
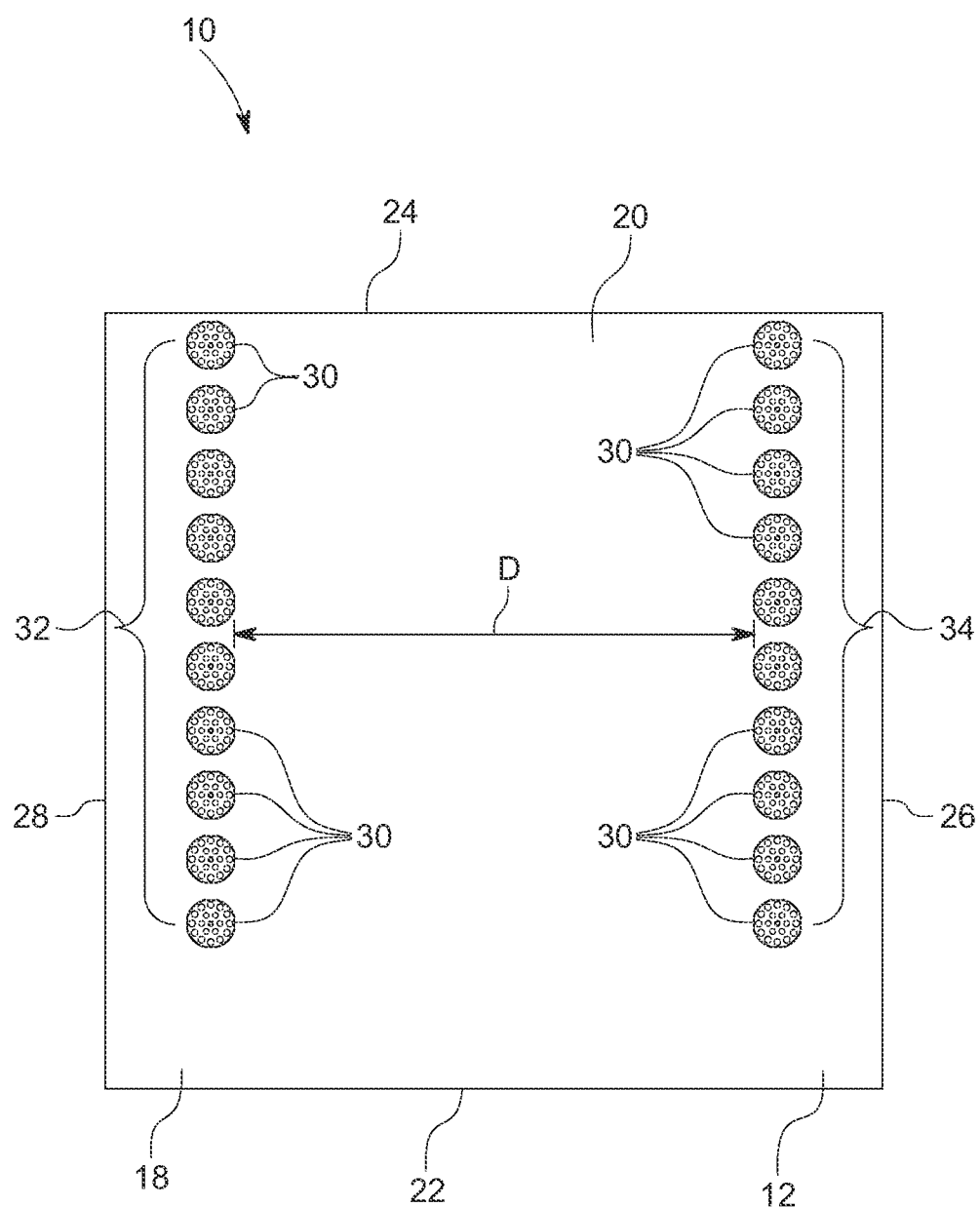
FIG. 3 is a top plan view of the apparatus.

As used herein, the terms "comprise", "comprising", "comprises", "includes", "including", "has", "having" or any other variation thereof, are intended to cover a non-exclusive inclusion. For example, a process, method, article or apparatus that comprises a list of elements is not necessarily limited to only those elements, but may include other elements not expressly listed or inherent to such process, method, article or apparatus.

As used herein, terms such as "vertical", "horizontal", "top", "bottom", "base", "upper", "lower", "middle", "above", "below" and the like are used for convenience in identifying relative locations of various components and surfaces relative to one another in reference to the drawings and are not intended to be limiting in any way.

Approximating language, as used herein throughout the specification and claims, may be applied to modify any quantitative representation that could permissibly vary without resulting in a change in the basic function to which it is related. Accordingly, a value modified by a term such as "about" or "approximately" is not limited to the precise value specified.

Reference in the specification to "an exemplary embodiment", "one embodiment", "an embodiment" or "some embodiments", means that a particular feature, structure or characteristic described in connection with the embodiment is included in at least one embodiment of the invention. The appearances of the phrases "an exemplary embodiment", "one embodiment", "embodiment" or "some embodiments" in various places in the specification are not necessarily all referring to the same embodiment.

As used herein, the term "operating surface" and "ferromagnetic operating surface" are used interchangeably herein and refer to a ferromagnetic surface upon which a magnetic crawler operates or maneuvers.

Referring to FIGS. 1, 2A, 2B, 3 and 4, there is shown apparatus 10 for releasing a magnetic crawler from a ferromagnetic operating surface in accordance with an exemplary embodiment. Apparatus 10 is configured to gradually reduce the magnetic attraction of the magnetic crawler to the ferromagnetic operating surface. Apparatus 10 comprises ramp 12 which is fabricated from lightweight non-magnetic material. In this embodiment, ramp 12 is a solid body of the lightweight non-magnetic materials. Examples of suitable non-magnetic materials include, but are not limited to, wood, plastic, rubber, resin, polyvinylchloride, polypropylene and composites. In some embodiments, the non-magnetic material is highly buoyant. Highly buoyant non-magnetic materials allow ramp 12 to float in a body of water. In some embodiments, ramp 12 is fabricated from lightweight non-ferromagnetic metals such as aluminum.

Ramp 12 comprises base portion 14 which has bottom surface 16. Ramp 12 further comprises upper portion 18 which has inclined, top surface 20. Inclined, top surface 20 is configured to receive a magnetic crawler (not shown). Ramp 12 further includes front end 22 and rear end 24. Front end 22 has a small thickness so as to allow the magnetic crawler to easily drive onto top surface 20. Ramp 12 includes left side portion 26 that is contiguous with base portion 14 and upper portion 18. Ramp 12 further includes right side portion 28 that is contiguous with base portion 14 and upper portion 18. The height of rear end 24 determines the incline of top surface 20. The height of ramp 12 linearly tapers from rear end 24 to front end 22. The incline in top surface 20 results in a gradual increase in the thickness of ramp 12 from front end 22 to rear end 24. In some embodiments, the degree of inclination of top surface 20 is between about 10° and 30°. However, in other embodiments, ramp 12 may be configured to have a degree of inclination less than 10° or greater than 30°. The gradual increase in the thickness of ramp 12 gradually increases the distance between the magnetic crawler and the ferromagnetic operating surface as the magnetic crawler is driven higher upon ramp 12. As the magnetic crawler is driven higher upon ramp 12, the magnetic attraction between the magnetic crawler and the ferromagnetic operating surface is gradually reduced. This reduction in magnetic attraction is based on the principle that a magnetic force is inversely proportional to the distance between a magnetic object and a ferromagnetic object.

Referring to FIGS. 1, 2A, 2B and 3, apparatus 10 further comprises ferromagnetic members 30 that are positioned on top surface 20 of upper portion 18. Ferromagnetic members 30 are configured to be magnetically attached to the tracks or wheels of a magnetic crawler. Ferromagnetic members 30 are linearly arranged in two columns, indicated by reference numbers 32 and 34, which extend between front end 22 and rear end 24. Columns 32 and 34 are spaced apart by a predetermined distance D so that ferromagnetic members 30 of column 32 become magnetically attached to the left side tracks or wheels of the magnetic crawler and ferromagnetic members 30 of column 34 become magnetically attached to the right side tracks or wheels of the magnetic crawler. Ferromagnetic members 30 may be any suitable ferromagnetic object. Examples of suitable ferromagnetic members 30 include, but are not limited to, screws, bolts, washers, nails, spikes, nuts, magnets and metallic strips. Ferromagnetic members 30 may be attached or joined to top surface 20 by any suitable method including, but not limited to, screws, rivets and adhesives. In some embodiments, each ferromagnetic member 30 is configured with an integral screw portion that allows the ferromagnetic member 30 to be screwed into top surface 20. In some embodiments, each ferromagnetic member 30 has a through-hole therein to allow a fastener to be inserted therethrough for attaching the ferromagnetic member 30 to top surface 20. In some embodiments, each ferromagnetic member 30 is recessed into top surface 20 so that the ferromagnetic member 30 is substantially flush with top surface 20. In other embodiments, ferromagnetic members 30 protrude slightly from top surface 20. In some embodiments, ferromagnetic members 30 are protected by a protective film to prevent damage. The protective film does not interfere with the ability of the ferromagnetic members 30 to become magnetically attached to the tracks or wheels of the magnetic crawler. In one embodiment, the protective film is attached to top surface 20 via heat shrinking.

Figure 4:
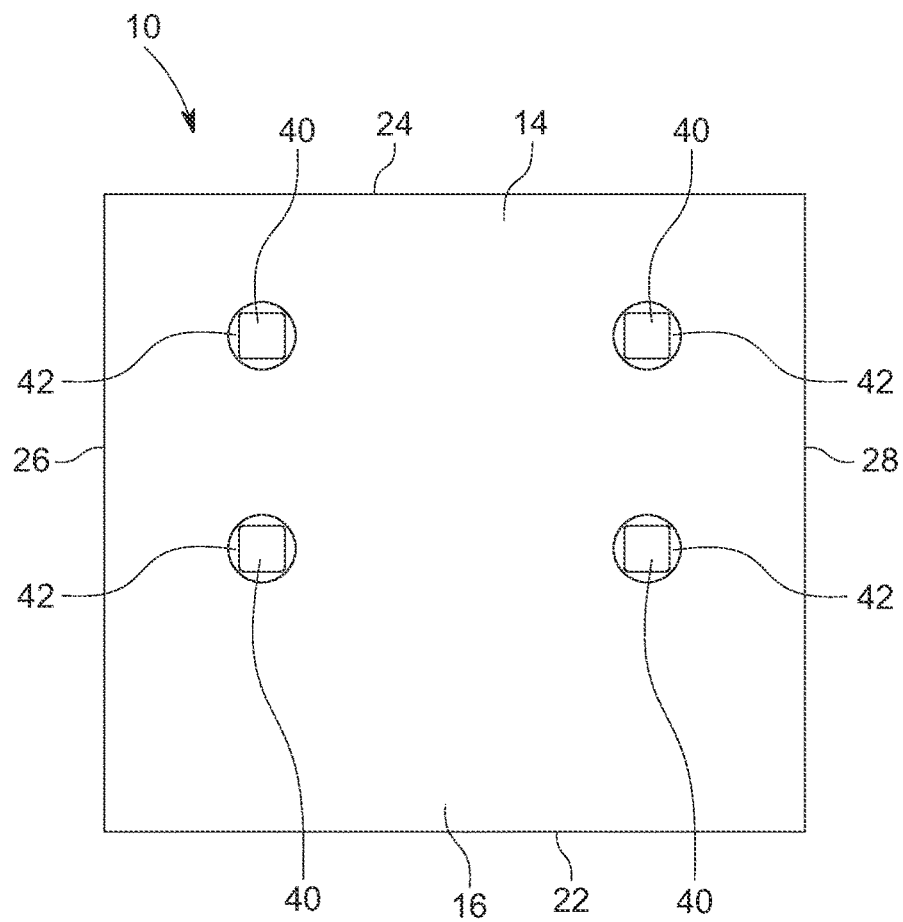
FIG. 4 is a bottom plan view of the apparatus.

Referring to FIG. 4, apparatus 10 further comprises a plurality of magnets 40 that are attached or joined to bottom surface 14 of ramp 12. Each magnet 40 is configured to be magnetically attached to the ferromagnetic operating surface upon which the magnetic crawler operates or maneuvers. In a preferred embodiment, the number and size of the magnets 40 are selected to provide more than the minimum holding force necessary to hold apparatus 10 in place on the operating surface while the magnetic crawler is fully loaded onto ramp 12, but less than the holding force that the magnetic crawler exerts directly on the operating surface during operations, thereby enabling an operator to remove the ramp and magnetic crawler from the operating surface with less effort than would otherwise be required to remove the magnetic crawler directly from the surface. For example, if it is expected that the magnetic crawler will be retrieved from a vertical or overhanging operating surface, the number and size of magnets 40 must be selected to provide a holding force that is sufficient to counteract the force of gravity imposed by the combined weights of apparatus 10 and the magnetic crawler, and hold apparatus 10 to the operating surface. The holding force exerted by magnets 40 should range between the minimum force necessary to hold the loaded apparatus on the operating surface and the force exerted by the magnetic crawler directly on the operating surface during operations. In a preferred embodiment, the designed holding force will be at the lower end of that range to facilitate easier removal of apparatus 10, with the magnetic crawler attached, from the operating surface. In an alternate embodiment, the designed holding force will be slightly less than the minimum force necessary to hold the loaded apparatus on a vertical or overhanging operating surface so that the apparatus 10 will fall away from the operating surface under the force of gravity when the magnetic crawler is loaded onto it.

In some embodiments, each magnet 40 is positioned within a corresponding recess 42 that is formed in bottom surface 14. Any suitable technique or method may be used to retain each magnet 40 within a corresponding recess 42. For example, in one embodiment, an adhesive is used to attach each magnet 40 to the inner walls of the corresponding recess 42. In other embodiments, fasteners, such as screws, rivets or nails, are used to attach or join magnet 40 to the inner walls of recess 40. In some embodiments, each recess 42 is configured so the corresponding magnet 40 is substantially flush with bottom surface 14. In other embodiments, each recess 42 is configured so that each magnet 40 is below bottom surface 14. In other embodiments, each recess 42 is configured so that the corresponding magnet 40 protrudes above bottom surface 14. In some embodiments, each magnet 40 has a through-hole therein for receiving a fastener (e.g. screw) for attaching the magnet 40 to the inner walls of recess 42. In other embodiments, recesses 42 are not used and each magnet 40 is attached to joined directly to bottom surface 14 using any suitable technique, including but not limited to, adhesives, screws, nails, rivets or other suitable fasteners. In some embodiments, magnets 40 are covered with a layer of protective material, such as a protective film. In one embodiment, the protective film is attached to bottom surface 14 via heat shrinking.

Ramp 12 may be configured to have different shapes and/or angles depending upon the size of the magnetic crawler, the magnetic strength of the magnetic crawler, and the particular operating surface on which the magnetic crawler will operate. For example, if the operating surface is the interior wall of a pipe, ramp 12 may be configured to have a curve so as to correspond to the curve of the interior wall of the pipe.

Apparatus 10 may be used in vertical, horizontal or angulated orientations. Angulated orientation refers to orientation at an angle between horizontal and vertical, i.e. an angle between 0° and 90°. For example, an operating surface may have a 45° slope or incline. If the operating surface is substantially flat or horizontal, such as a flat top of a steel storage tank, apparatus 10 is positioned on the operating surface and in front of the magnetic crawler. Magnets 40 become magnetically attached to the operating surface. Next, the magnetic crawler is driven up the inclined surface 20 of ramp 12. As the magnetic crawler moves up on ramp 12, the magnetic bond between the magnetic crawler and the operating surface is gradually reduced and the magnetic bonds between the tracks of the magnetic crawler and ferromagnetic members 30 are gradually strengthened. Once the magnetic bond between the magnetic crawler and the operating surface is broken, the magnetic crawler with apparatus 10 attached thereto may be lifted off of the operating surface and readied for transport. The recovery boom only needs to handle the weight of ramp 12 and the magnetic crawler. The recovery boom does not have to overcome any magnetic bond between the magnetic crawler and the operating surface because such magnetic bond is eliminated when the magnetic crawler is driven up ramp 12. Since ramp 12 remains magnetically attached to the magnetic crawler, ramp 12 covers the tracks or wheels of the magnetic crawler so as to prevent the tracks or wheels from magnetically attracting other ferromagnetic materials or objects.

In another example, the operating surface may be vertical, in which case, apparatus 10 may be magnetically attached to the vertical operating surface. The magnetic crawler is then driven upward to ascend the inclined, top surface 20 so as to gradually attenuate the magnetic bond between the magnetic crawler and the vertical operating surface while simultaneously strengthening the magnetic bond between the tracks of the magnetic crawler and ferromagnetic members 30. Personnel or operators may hold onto the magnetic crawler as it ascends the inclined, top surface 20. Once the magnetic bond between the magnetic crawler and the vertical operating surface is significantly weakened, the personnel or operators may easily remove the magnetic crawler, with apparatus 10 attached thereto, from the operating surface. If the magnetic crawler is relatively heavy, gravity will cause the magnetic crawler to fall off of ramp 12 when the magnetic bond between the magnetic crawler and vertical operating surface is broken. In such a scenario, one or more lines or cables are attached to the magnetic crawler and a lifting device or recovery boom (e.g. crane) so that when the magnetic crawler becomes disengaged from ramp 12, the magnetic crawler will be suspended by the cables or ropes and will not be damaged.

Ramp 12 imparts minimal stress to the magnetic crawler. The operator maintains full control over the magnetic crawler as it ascends ramp 12. Once apparatus 10 is positioned on the operating surface and magnets 40 become magnetically attached to the operating surface, the operator does not need to hold or touch apparatus 10 while the magnetic crawler ascends ramp 12. Additionally, the operator does not have to hold or touch apparatus 10 while the magnetic crawler and apparatus are removed from the operating surface thereby freeing the operator to concentrate on handling the magnetic crawler. In most cases, apparatus 10 allows for a single operator to recover the magnetic crawler.

Ramp 12 may be configured to have different shapes and/or angles depending upon the size of the magnetic crawler, the magnetic strength of the magnetic crawler, and the particular operating surface on which the magnetic crawler will operate. For example, if the operating surface is the interior wall of a pipe, ramp 12 may be configured to have a curve so as to correspond to the curve of the interior wall of the pipe.

Figure 5:
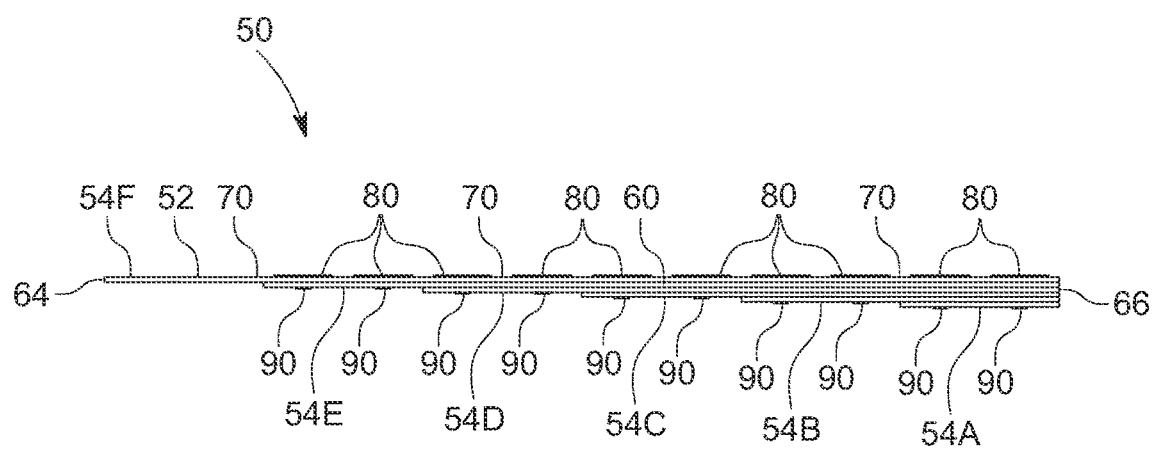
FIG. 5 is a left side elevational view of an apparatus for releasing a magnetic crawler from a ferromagnetic operating surface in accordance with another exemplary embodiment.
Figure 6:
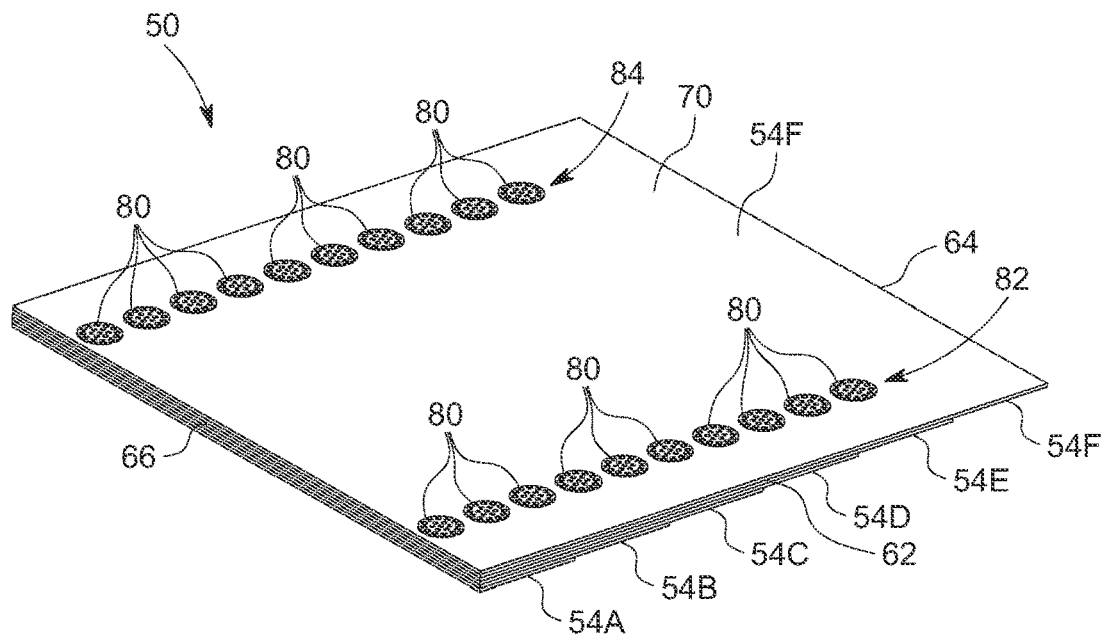
FIG. 6 is a perspective view of the apparatus of FIG. 5, the view showing the rear end, right side and top portion of the apparatus.
Figure 7:
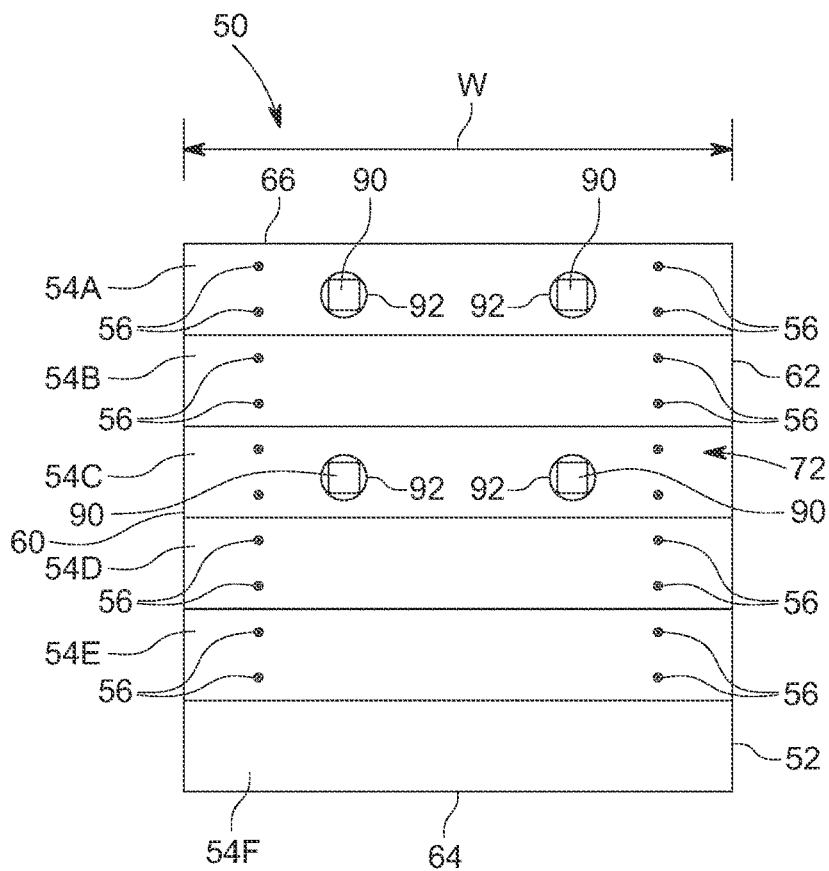
FIG. 7 is a bottom plan view of the apparatus of FIG. 5.

Referring to FIGS. 5, 6 and 7, there is shown apparatus 50 for receiving a magnetic crawler in accordance with another exemplary embodiment. Apparatus 50 performs the same functions as apparatus 10 and operates in the same manner as apparatus 10. Apparatus 50 may operate in vertical, horizontal or angulated orientations. Apparatus 50 is configured to gradually reduce the magnetic attraction of the magnetic crawler to the operating surface. In the exemplary embodiment shown, apparatus 50 comprises ramp 52 which is formed by a stack of laminations 54A-F of lightweight non-magnetic material. Examples of suitable non-magnetic materials include, but are not limited to, wood, plastic, rubber, resin, polyvinylchloride, polypropylene and composites. In some embodiments, the non-magnetic material is highly buoyant. Highly buoyant non-magnetic materials allow ramp 52 to float in water. In some embodiments, each lamination 54A-F is a lightweight non-ferromagnetic metal. An example of a suitable lightweight non-ferromagnetic metal is aluminum. Laminations 54A-F are attached or joined together via any suitable method or technique. Examples of suitable techniques or methods for attaching or joining laminations 54A-F together include adhesives, screws, rivets, bolts or other fasteners. In some embodiments, screws 56 are used to attach laminations 54A-F together (see FIG. 7). Lamination 54A is a lowermost lamination. Lamination 54F is an uppermost lamination. Laminations 54B-E are intermediate laminations. As shown in FIGS. 5 and 7, each lamination 54A-F has the same width W and a different length. Uppermost lamination 54F has the longest length and lowermost lamination 54A has the shortest length. The variation in lengths of laminations 54A-F provide ramp 52 with an incline. The stack of laminations 54A-F provide ramp 52 with a left side 60, right side 62, front end 64 and rear end 66. Uppermost lamination 54F defines the top surface 70 of ramp 52. Top surface 70 receives the magnetic crawler. Front end 64 is formed only by the front edge of uppermost lamination 54F so as to allow the magnetic crawler to easily climb up on ramp 52. Lowermost lamination 54A and portions of laminations 54B-E cooperate to define a bottom side, which is generally indicated by reference number 72. Bottom side 72 confronts and contacts the operating surface. Apparatus 50 further comprises ferromagnetic members 80 positioned on top surface 70. Ferromagnetic members 80 are configured to be magnetically attached to tracks or wheels of a magnetic crawler. Ferromagnetic members 80 are linearly arranged in two columns, indicated by reference numbers 82 and 84, which extend between front end 64 and rear end 66. Columns 82 and 84 are spaced apart by a predetermined distance so that ferromagnetic members 80 of column 82 become magnetically attached to the left side tracks or wheels of the magnetic crawler and ferromagnetic members 80 of column 84 become magnetically attached to the right side tracks or wheels of the magnetic crawler. Ferromagnetic members 80 may be any suitable ferromagnetic object, examples of which were described in the foregoing description regarding ferromagnetic members 30. Ferromagnetic members 80 may be attached to top surface 70 of ramp 52 by any of the techniques and methods discussed in the foregoing description relating to the attachment of ferromagnetic members 30 to top surface 20 of ramp 12. In some embodiments, ferromagnetic members 80 are covered with a layer of protective material, such as a protective film, to protect ferromagnetic members 80. In one embodiment, the protective film is attached to top surface 70 via heat shrinking.

Referring to FIG. 7, apparatus 50 further comprises a plurality of magnets 90 that are attached to the bottom side of lowermost lamination 54A and to the exposed bottom sides of intermediate laminations 54B-E. Magnets 90 perform the same function and have the same configuration as magnets 40 of apparatus 10. Each magnet 90 is configured to be magnetically attached to the ferromagnetic operating surface upon which the magnetic crawler operates or maneuvers. Each magnet 90 may be attached, joined or mounted to the bottom side of lowermost lamination 54A and to the exposed bottom sides of intermediate laminations 54B-E by any of the techniques and methods described in the foregoing description regarding magnets 40 of apparatus 10. In some embodiments, each magnet 90 is positioned within recess 92. In some embodiments, magnets 90 are covered with a layer of protective material, such as a protective film, to protect magnets 90. In one embodiment, the protective film is attached via heat shrinking.

Although ramp 52 is described as having six laminations 54A-F, ramp 52 may be configured with more than or less than six laminations. Although four magnets 90 are shown in FIG. 7, apparatus 50 may have more than or less than four magnets 90. In some embodiments, apparatus 50 includes at least one handle joined or attached to ramp 52 to enable the operators to handle or carry apparatus 50. In some embodiments, apparatus 50 includes at least one flotation device attached or joined to ramp 52 to allow ramp 52 to float in a body of water.

Ramp 52 may be configured to have different shapes and/or angles depending upon the size of the magnetic crawler, the magnetic strength of the magnetic crawler and the particular operating surface on which the magnetic crawler will operate. For example, if the operating surface is the interior wall of a pipe, ramp 52 may be configured to have a curve so as to correspond to the curve of the interior wall of the pipe.

Apparatuses 10 and 50 may be used for any one of variety of tasks including, but not limited to, commercial ship cleaning and inspection, pipeline inspection, storage tank inspection and repair, inspection of nuclear reactors, inspection of elevator shafts, inspection of steel structures such as towers, steel bridges and steel girder structures during building construction.

The foregoing description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. In this regard, while the disclosed subject matter has been described in connection with various embodiments and corresponding Figures, where applicable, it is to be understood that other similar embodiments can be used or modifications and additions can be made to the described embodiments for performing the same, similar, alternative or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. An apparatus for releasing a magnetic crawler from a ferromagnetic operating surface, comprising:
    a ramp fabricated from non-magnetic material and comprising a base portion, an inclined upper portion for receiving a magnetic crawler, a front end and a rear end;
    a plurality of ferromagnetic members positioned on the upper portion and configured to be magnetically attached to tracks or wheels of a magnetic crawler; and
    a plurality of magnets positioned on the bottom portion and configured to be magnetically attached to a ferromagnetic operating surface upon which the magnetic crawler operates.

2. The apparatus according to claim 1 wherein the plurality of magnets positioned on the bottom are selected to provide a magnetic force that is less than the magnetic force exerted by the magnetic crawler on the ferromagnetic operating surface.

3. The apparatus according to claim 2 wherein the plurality of magnets positioned on the bottom are selected to provide a magnetic force that is greater than the minimum magnetic force required to hold the apparatus to the operating surface when the magnetic crawler is loaded onto the apparatus.

4. The apparatus according to claim 1 wherein the ramp comprises a solid body of non-magnetic material.

5. The apparatus according to claim 1 wherein the ramp comprises a stack of laminations of non-magnetic material.

6. The apparatus according to claim 1 wherein the ramp has a height that linearly tapers from the rear end to the front end.

7. The apparatus according to claim 1 wherein the plurality of ferromagnetic members comprises:
    a first group of ferromagnetic members linearly arranged between the front end and the rear end; and
        a second group of ferromagnetic members spaced apart from the first group ferromagnetic members and linearly arranged between the front end and the rear end.

8. The apparatus according to claim 1 wherein the base portion has a bottom surface and wherein the magnets are substantially flush with the bottom surface.

9. The apparatus according to claim 1 wherein the base portion has a bottom surface and wherein the magnets protrude from the bottom surface.

10. The apparatus according to claim 1 wherein the non-magnetic material is chosen from the group consisting of plastic, rubber, resin, polyvinylchloride, polypropylene, wood and composites.

11. The apparatus according to claim 1 wherein the plurality of ferromagnetic members are chosen from the group consisting of screws, bolts, washers, nails, spikes, nuts, magnets and metallic strips.

12. An apparatus for releasing a magnetic crawler from a ferromagnetic operating surface, comprising:
   a ramp fabricated from non-magnetic materials and comprising a base portion having a bottom surface, an upper portion having an inclined top surface for receiving a magnetic crawler, a front end and a rear end;
   a first plurality of ferromagnetic members on the top surface of the upper portion and linearly arranged between the front end and the rear end, wherein the first plurality of ferromagnetic members is configured to be magnetically attached to a portion of a magnetic crawler;
   a second plurality of ferromagnetic members on the top surface of the upper portion and linearly arranged between the front end and the rear end, wherein the second plurality of ferromagnetic members is spaced apart from the first plurality of ferromagnetic members and configured to be magnetically attached to another portion of the magnetic crawler; and
   a plurality of magnets positioned on the bottom surface of the base portion and configured to be magnetically attached to a ferromagnetic surface.

13. The apparatus according to claim 12 wherein the plurality of magnets positioned on the bottom are selected to provide a magnetic force that is less than the magnetic force exerted by the magnetic crawler on the ferromagnetic operating surface.

14. The apparatus according to claim 13 wherein the plurality of magnets positioned on the bottom are selected to provide a magnetic force that is greater than the minimum magnetic force required to hold the apparatus to the operating surface when the magnetic crawler is loaded onto the apparatus.

15. The apparatus according to claim 12 wherein the ramp comprises a solid body of non-magnetic material.

16. The apparatus according to claim 12 wherein the ramp comprises a stack of laminations of non-magnetic material.

17. The apparatus according to claim 12 wherein the ramp has a height that linearly tapers from the rear end to the front end.

18. The apparatus according to claim 12 wherein the non-magnetic material is a highly buoyant material.

19. An apparatus for releasing a magnetic crawler from a ferromagnetic operating surface, comprising:
   a ramp fabricated from highly buoyant, non-magnetic material and comprising a base portion having a bottom surface, an upper portion having an inclined top surface for receiving a magnetic crawler, a front end and a rear end, the ramp having a height that linearly tapers from the rear end to the front end, the ramp further comprising a left side portion contiguous with the base portion and upper portion, and a right side portion contiguous with the base portion and upper portion;
   a first plurality of ferromagnetic members on the top surface of the upper portion and linearly arranged in a first column that extends between the front end and the rear end, wherein the first plurality of ferromagnetic members is configured to be magnetically attached to a portion of a magnetic crawler;
   a second plurality of ferromagnetic members on the top surface of the upper portion and linearly arranged in a second column that extends between the front end and the rear end, wherein the second column is spaced apart from the first column, wherein the second plurality of ferromagnetic members is configured to be magnetically attached to another portion of the magnetic crawler; and
   a plurality of magnets on the bottom surface of the base portion and configured to be magnetically attached to a ferromagnetic operating surface upon which the magnetic crawler operates.

20. The apparatus according to claim 19 wherein the plurality of magnets positioned on the bottom are selected to provide a magnetic force that is less than the magnetic force exerted by the magnetic crawler on the ferromagnetic operating surface and that is equal to or greater than the minimum magnetic force required to hold the apparatus to the operating surface when the magnetic crawler is loaded onto the apparatus.

* * * * *